US012597173B2

(12) United States Patent
Baheti et al.

(10) Patent No.: US 12,597,173 B2
(45) Date of Patent: Apr. 7, 2026

(54) AUTOMATIC GENERATION OF AN IMAGE HAVING AN ATTRIBUTE FROM A SUBJECT IMAGE

(71) Applicant: Avaya Management L.P., Durham, NC (US)

(72) Inventors: Ghanshyam Asaram Baheti, Pune (IN); Harshal Ramesh Gawande, Pune (IN); Trupti Vikas Dhore, Pune (IN)

(73) Assignee: Avaya Management L.P., Morristown, NJ (US)

( * ) Notice: Subject to any disclaimer, the term of this patent is extended or adjusted under 35 U.S.C. 154(b) by 982 days.

(21) Appl. No.: 17/573,148

(22) Filed: Jan. 11, 2022

(65) Prior Publication Data

US 2023/0222703 A1     Jul. 13, 2023

(51) Int. Cl.
| | |
|---|---|
| *G06T 11/00* | (2006.01) |
| *G06F 3/0482* | (2013.01) |
| *G06F 18/22* | (2023.01) |
| *G06F 40/30* | (2020.01) |
| *G06V 40/16* | (2022.01) |

(52) U.S. Cl.
CPC ............ *G06T 11/00* (2013.01); *G06F 3/0482* (2013.01); *G06F 18/22* (2023.01); *G06F 40/30* (2020.01); *G06V 40/174* (2022.01)

(58) Field of Classification Search
CPC ......... G06T 11/00; G06F 18/22; G06F 3/0482
See application file for complete search history.

(56) References Cited

U.S. PATENT DOCUMENTS

| | | | | |
|---|---|---|---|---|
| 10,043,102 B1* | 8/2018 | Goenka | ............... | G06V 10/751 |
| 11,437,034 B2* | 9/2022 | Lee | ...................... | G06V 10/764 |
| 2005/0261032 A1* | 11/2005 | Seo | ....................... | A63F 13/825 |
| | | | | 455/566 |
| 2010/0008424 A1* | 1/2010 | Pace | .................... | H04N 19/433 |
| | | | | 375/E7.125 |
| 2014/0088750 A1* | 3/2014 | Sharma | .................. | B33Y 50/00 |
| | | | | 700/118 |

(Continued)

OTHER PUBLICATIONS

Abdal, et al, "StyleFlow: Attribute-conditioned Exploration of StyleGAN-Generated Images using Conditional Continuous Normalizing Flows", CVPR, 2020, pp. 1-22 (Year: 2020).*

(Continued)

*Primary Examiner* — Edward Park

(57) ABSTRACT

The technology disclosed herein enables automatic generation of an image having an attribute using a subject image as a basis for the generated image. In a particular embodiment, a method includes executing a generator and a discriminator. Until a criterion is satisfied, the method includes iteratively performing steps a-c. In step a, the method includes providing an input vector and an attribute to the generator. The generator outputs a generated image. In step b, the method includes providing the generated image to the discriminator. The discriminator outputs feedback that indicates differences between the generated image and a subject image. In step c, the method includes determining whether the differences satisfy the criterion. When the differences do not satisfy the criterion, the input vector comprises the feedback in the next iteration of steps a-c. When the differences satisfy the criterion, the method includes associating the generated image with the attribute.

20 Claims, 10 Drawing Sheets

100

(56)               References Cited

U.S. PATENT DOCUMENTS

| | | | |
|---|---|---|---|
| 2019/0228552 A1* | 7/2019 | Lee | G06T 11/60 |
| 2019/0373242 A1* | 12/2019 | Miki | H04N 13/194 |
| 2020/0285938 A1* | 9/2020 | Kim | G06T 7/136 |
| 2020/0402304 A1* | 12/2020 | Hwang | G06T 7/168 |
| 2022/0019855 A1* | 1/2022 | Chen | G06N 3/045 |
| 2023/0222703 A1* | 7/2023 | Baheti | G06F 40/30 |
| | | | 382/181 |

OTHER PUBLICATIONS

Ansari, et al., "Refining Deep Generative Models via Discriminator Gradient Flow", ICLR, 2021, pp. 1-24 (Year: 2021).*

* cited by examiner

EXECUTE GENERATOR 111 AND DISCRIMINATOR 112 201

ATTRIBUTE 131 AND INPUT VECTOR 132 INPUT TO GENERATOR 112 202

SUBJECT IMAGE 134 & IMAGE 133 INPUT TO DISCRIMINATOR 112 203

IMAGE 133 SATISFY CRITERIA? 204

NO

YES

ASSOCIATE IMAGE 133 WITH ATTRIBUTE 131 205

200

ANALYZE USER COMMUNICATIONS 901

EXTRACT TEXT SEMANTICS, USER SENTIMENT, AND/OR VOICE TONE 902

DETERMINE AN EMOTION ASSOCIATED WITH THE EXTRACTIONS 903

SELECT IMAGE ASSOCIATED WITH THE EMOTION 904

900

AUTOMATIC GENERATION OF AN IMAGE HAVING AN ATTRIBUTE FROM A SUBJECT IMAGE

TECHNICAL BACKGROUND

Emojis and emoticons are used by people to express themselves when using a computing device. For example, when a user participating in a text conversation with another user wants to express that they are sad, they may include an emoji representing a sad face. While emojis and emoticons are often sufficient to visually convey information (e.g., emotion, sentiment, etc.) on the user's behalf, emojis and emoticons typically do not resemble the user. Some more recent alternatives to emojis and emoticons allow a user to create an animated representation of themselves for use in situations similar to those where emojis and emoticons may be used. Even though the animated representations are likely to better resemble the user's actual physical appearance, they are still not showing the actual user.

SUMMARY

The technology disclosed herein enables automatic generation of an image having an attribute using a subject image as a basis for the generated image. In a particular embodiment, a method includes executing a generator and a discriminator. Until a criterion is satisfied, the method includes iteratively performing steps a-c. In step a, the method includes providing an input vector and an attribute to the generator. The generator outputs a generated image. In step b, the method includes providing the generated image to the discriminator. The discriminator outputs feedback that indicates differences between the generated image and a subject image. In step c, the method includes determining whether the differences satisfy the criterion. When the differences do not satisfy the criterion, the input vector comprises the feedback in the next iteration of steps a-c. When the differences satisfy the criterion, the method includes associating the generated image with the attribute.

In some examples, in a first iteration of steps a-c, the input vector comprises a random input vector.

In some examples, the subject image comprises an image of a user and the attribute comprises an indicator of an emotion. In those examples, when differences satisfy the criterion, the generated image may be an image of the user expressing the emotion.

In some examples, until the criterion is satisfied, iteratively performing steps d-f. In step d, the method includes providing a second input vector and a second attribute to the generator. the generator outputs a second generated image. In step e, the method includes, providing the second generated image to the discriminator. The discriminator outputs second feedback that defines second differences between the second generated image and the subject image. In step f, the method includes, determining whether the second differences satisfy the criterion. When the second differences do not satisfy the criterion, the second input vector comprises the second feedback in the next iteration of steps a-c. When the second differences satisfy the criterion, the method includes associating the second generated image with the second attribute.

In some examples, the method includes transmitting the generated image over a communication session established between a first endpoint and a second endpoint. In those examples, the subject image may be an image of a user operating the first endpoint. Further in those examples, before transmitting the generated image, the method may include receiving, from the user, a selection of the generated image from a plurality of generated images that are each associated with respective ones of a plurality of attributes. Also, before receiving the selection, the method may include presenting the plurality of generated images to the user. In some of those examples, before transmitting the generated image, the method may include identifying a context of user communications received from the user, determining that the context corresponds to the attribute, and selecting the generated image from a plurality of generated images based on the attribute.

In another example, an apparatus is provided having one or more computer readable storage media and a processing system operatively coupled with the one or more computer readable storage media. Program instructions stored on the one or more computer readable storage media, when read and executed by the processing system, direct the processing system to execute a generator and a discriminator. Until a criterion is satisfied criterion, the program instructions direct the processing system to iteratively perform steps a-c. In step a, the processing system provides an input vector and an attribute to the generator, wherein the generator outputs a generated image. In step b, the processing system provides the generated image to the discriminator, wherein the discriminator outputs feedback that defines differences between the generated image and a subject image. In step c, the processing system determines whether the differences satisfy the criterion, wherein, when the differences do not satisfy the criterion, the input vector comprises the feedback in the next iteration of steps a-c. When the differences satisfy the criterion, the program instructions direct the processing system to associate the generated image with the attribute.

DETAILED DESCRIPTION

Figure 1:
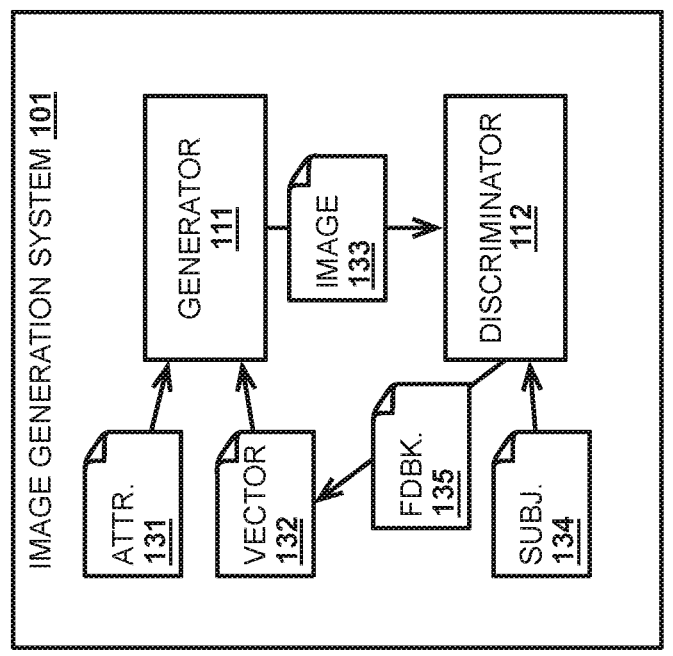
FIG. 1 illustrates an implementation for automatically generating an image, having an attribute, from a subject image.
Figure 1:

The image generation systems described herein automatically generate images from a subject image of a user. The generated images show the user having attributes that the user did not have in the subject image. For example, the subject image may show an emotionless expression on the user's face and the generated image may show what is predominantly the subject image but with a smile on the user's face to show that they are happy (e.g., the attribute may be an expression of happiness). To ensure that the generated image does not stray too far from the original subject image (i.e., to ensure the generated image still looks like the user), the image generation systems execute a generator and a discriminator, which include artificial intelligence (AI) models that work together to generate the image and are sometimes referred to as Generative Adversarial Networks (GANs). The generator generates an image that it has determined to have the desired attribute and the discriminator determines whether that generated image is similar enough to the subject image. If not, feedback that describes the differences between the generated image and the subject image, is fed back into the generator so that the generator can generate a new generated image that is more like the subject image. That process repeats until the discriminator determines that the generated image is similar enough to the subject image and then the most recently generated image is used as the image having the attribute.

In practice, an image generation system can generate any number of images having various attributes. A user could, therefore, supply a single subject image of themselves to the image generation system and receive versions of the subject image that show the user expressing themselves in different ways. If a user wants images of themselves being happy, sad, laughing, etc., the user does not need to take individual photos of themselves expressing those various emotions. Rather, the user simply provides a single subject image and lets the image generation system do all the work necessary to produce images of the user expressing the various emotions. The user can then use those produced images for any reason they see fit, such as sending the images to other users over communication sessions, using the images as profile pictures for communications or social network platforms, using the images as avatars for the user, or for any other purpose. In some situations, one of the images may be selected automatically on behalf of the user. For example, during a communication session, a user system of the user, a system facilitating the session, or some other system, may monitor the user's communications and determine an emotion of the user (e.g., happy, sad, angry, etc.). A generated image associated with that emotion may be selected to display to other users on the communication session (e.g., the user's avatar image may be changed to the image associated with the emotion from a previous image).

FIG. 1 illustrates implementation 100 for automatically generating an image, having an attribute, from a subject image. Implementation 100 includes image generation system 101, which is executing generator 111 and discriminator 112. Though not shown, image generation system 101 includes processing circuitry and computer readable storage media for performing operation 200 described below. Image generation system 101 may be a telephone, tablet computer, laptop computer, desktop computer, conference room system, server, or some other type of computing device.

Figure 2:
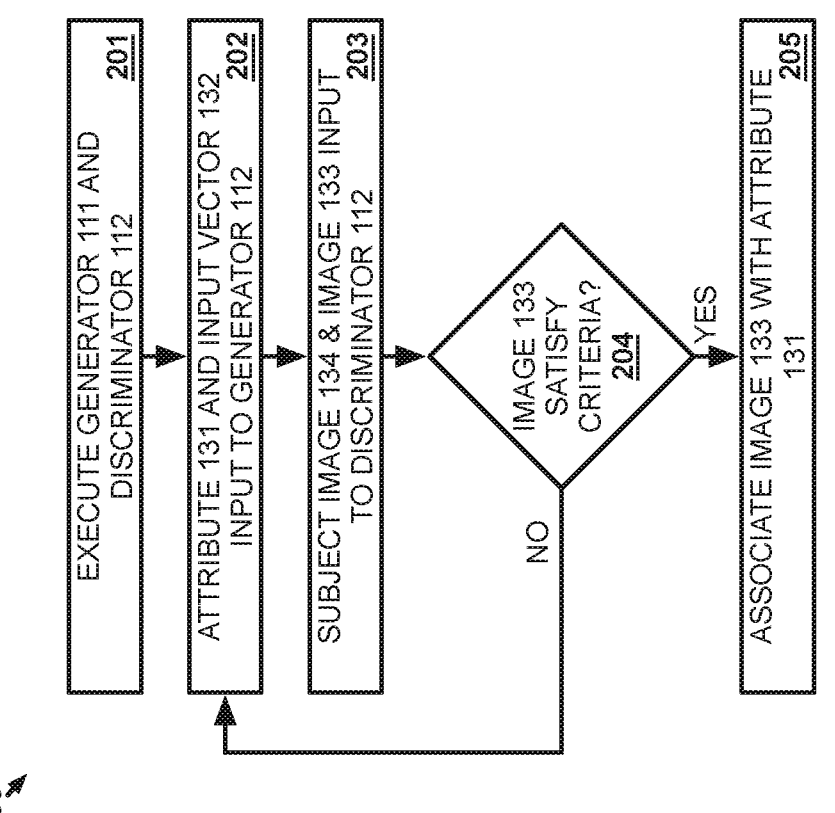
FIG. 2 illustrates an operation to automatically generate an image, having an attribute, from a subject image.

FIG. 2 illustrates operation 200 to automatically generate an image, having an attribute, from a subject image. In operation 200, image generation system 101 executes generator 111 and discriminator 112 (201). Generator 111 and discriminator 112 are AI models that are trained to perform as described below. Generator 111 and discriminator 112 may be trained by image generation system 101 or other system(s) may train generator 111 and discriminator 112 before execution on image generation system 101. Generator 111 is trained to produce generated image 133 in response to receiving attribute 131 and input vector 132 as input. Discriminator 112 is trained to produce feedback 135, which indicates differences between generated image 133 and subject image 134, and determine whether the differences satisfy at least one criterion (e.g., a threshold amount of similarity to the subject image). Subject image 134 is an image of a subject, such as a user of a computing device. Generator 111 is trained to modify the appearance of the subject in subject image 134 to make the subject appear to have attribute 131 in generated image 133. However, generator 111 does not modify the subject image directly but, instead, uses feedback 135, as detailed below.

Image generation system 101 provides input vector 132 and attribute 131 as input into generator 111 and generator 111 outputs generated image 133 (202). Attribute 131 may be an image of a subject having a desired attribute for subject image 134. For example, attribute 131 may be an image of a subject that is happy and generator 111 may be trained to recognize the expression made by that subject and create generated image 133 with characteristics of the smiling subject (e.g., teeth showing, lips curled up, eyes squinted, etc.). In alternative examples, generator 111 may already be trained on how specific attributes are to look in an image and attribute 131 may simply need to identify the desired attribute to generator 111. The attribute indicated by attribute 131 may be any attribute that can be expressed visually by a subject. For example, attribute 131 may be an emotion (e.g., happy, sad, pensive, angry, etc.) or an expression (e.g., smiling, frowning, laughing, etc.), which may correspond to an emotion. In another example, attribute 131 may be a gesture (e.g., thumbs up, clapping, etc.). While only one attribute 131 is shown in this example, multiple attributes may be used in other examples. For instance, the attributes may indicate a smiling subject who is giving a thumbs up gesture.

After generated image 133 is created, image generation system 101 then provides generated image 133 to discriminator 112 (203). Discriminator 112 outputs feedback 135 that defines the differences between generated image 133 and subject image 134. Unless discriminator 112 was trained on subject image 134 specifically, subject image 134 is also provided to discriminator 112 for use as a basis when generating feedback 135. Discriminator 112 further determines whether the differences defined by feedback 135 satisfy at least one criterion (204).

If the differences do not satisfy the at least one criterion, then image generation system 101 iterates through steps 202-203 again. During the first iteration described above, input vector 132 may be random data, or some other inconsequential data set, instead of feedback from discriminator 112 because no feedback 135 existed prior to completion of the first iteration. However, from completion of the first iteration onward, the most recently generated feedback 135 from discriminator 112 becomes input vector 132 for step 202 on the next iteration of steps 202-204. Since the first iteration is based on data that has no relation to subject image 134, it is exceedingly unlikely for there to be only one iteration of steps 202-204 when performing operation 200.

To define the differences between generated image 133 and subject image 134, feedback 135 includes data providing information about the differences in a format that generator 111 was trained to understand. For example, feedback 135 may be an image file where each pixel represents the difference between corresponding pixels in generated image

133 and subject image 134 (i.e., pixels at the same location in the respective images). When using feedback 135 in the next iteration of steps 202-204, generator 111 will attempt to generate a new generated image 133 that is closer to subject image 134 based on feedback 135 while having attribute 131. The differences may be determined using a pixel-by-pixel analysis between the two images, semantic feature vector analysis between the two images, or some other image comparison process.

Regardless of how feedback 135 represents the differences between generated image 133 and subject image 134, the at least one criterion is applied to the differences to indicate when generated image 133 is close enough to subject image 134 for the iteration of steps 202-204 to stop. The criterion may be explicitly defined for discriminator 112. For example, the criterion may require that image predication 135 indicate that a certain percentage generated image 133 should match subject image 134. The percentage would be some amount less than 100% (e.g., 90% match, or 10% different) because, if it was a 100% match, generated image 133 would simply be a copy of subject image 134 without any modification based on attribute 131. In other examples, the criteria may not be explicitly defined, rather, discriminator 112 may be trained to recognize when differences in feedback 135 indicates generated image 133 is sufficiently close to subject image 134 for iteration to stop. For example, during training, discriminator 112 may be provided with differences between subject images and generated images that are indicated to discriminator 112 as either being close enough to end iteration or not. Discriminator 112 would then create its own at least one criterion for recognizing when iteration should stop.

When the differences in feedback 135 satisfy the at least one criterion according to discriminator 112, image generation system 101 associates generated image 133 with attribute 131 (205). The generated image 133 being associated is the generated image 133 in the last iteration of steps 202-204 (i.e., the generated image 133 that discriminator 112 determined to have differences that satisfied the criterion), which may also be referred to as the predicted image (i.e., the image that the generator 111 and discriminator 112 combo determined to be a prediction of subject image 134 having attribute 131). Image generation system 101 may associate generated image 133 with attribute 131 by storing generated image 133 (locally or elsewhere) with an indication that generated image 133 represents attribute 131. For example, if attribute 131 indicates anger, then image generation system 101 will store generated image 133 and associate generated image 133 with anger (e.g., may tag the file for generated image 133 with anger, may store generated image 133 in a folder associated with anger, or may otherwise indicate that anger attribute to a system accessing generated image 133). As such, should image generation system 101, or another system, access generated image 133, that system will know that generated image 133 is associated with attribute 131. Continuing the anger attribute example from above, the user pictured in subject image 134 may desire an image of themselves angry (e.g., the user may want to send the image to another user on a communication session, may want to include the image in a document they are authoring, or may want to use the image for some other purpose). By associating generated image 133 with the anger attribute, the user may be able to search for an image having that attribute and find generated image 133 for their use.

In some examples, operation 200 may be repeated for different attributes so as to produce different generated images that each correspond to respective attributes. For example, from the same subject image 134, respective generated images 133 may be produced corresponding to happy, sad, angry, etc. A user pictured in subject image 134 would, therefore, not have to make all the expressions themselves and capture pictures thereof to generate the images.

Figure 3:
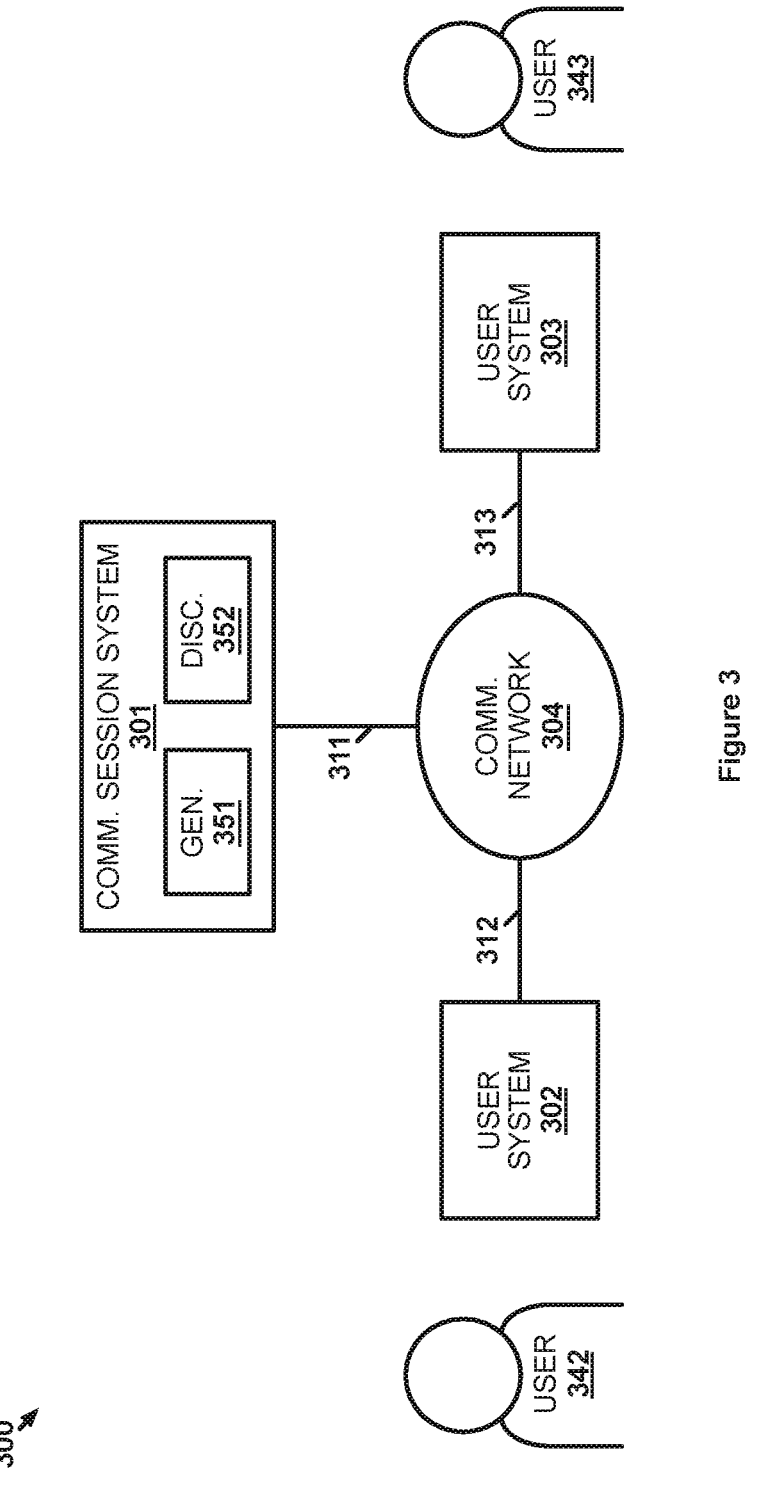
FIG. 3 illustrates an implementation for automatically generating an image, having an attribute, from a subject image.

FIG. 3 illustrates implementation 300 for automatically generating an image, having an attribute, from a subject image. Implementation 300 includes communication session system 301, user system 302, user system 303, and communication network 304. User 342 operates user system 302 and user 343 operates user system 303. Systems 301-303 communicate with communication network 304 over communications links 311-313, respectively. Communication links 311-313 may include wired and/or wireless transport media and are shown as direct links but may include intervening systems, networks, and/or devices. Communication network 304 includes one or more networks, such as a circuit switched telephone network, local area network, wide area network (e.g., the Internet), or some other type of network over which telecommunications may be carried—including combinations thereof.

In operation, user system 302 and user system 303 may each respectively be a telephone, tablet computer, laptop computer, desktop computer, conference room system, or some other type of computing device capable of connecting to a communication session facilitated by communication session system 301. Communication session system 301 facilitates communication sessions between two or more endpoints, such as user system 302 and user system 303. While shown as a single device, communication session system 301 may be distributed across multiple devices. Communication session system 301 may support the exchange of audio, video, text, images, files, and/or any other type of information on behalf of user system users. The communications exchanged over a session facilitated by communication session system 301 may be real-time user communications, such as a voice/video call, and/or may be non-real-time communications, such as text messaging or file sharing. In this example, communication session system 301 supports the sharing of images that have been generated by generator 351 and discriminator 352. Generator 351 and discriminator 352 are examples of generator 111 and discriminator 112 when the features of image generation system 101 are incorporated into a communication session system. In other examples, image generation system 101 may remain separate from communication session system 301 while still being able to provide generated images to communication session system 301 for the purposes described below. In some examples, user system 302 and user system 303 may execute a communication client application that enables them to communicate with communication session system 301 and receive the services provided thereby.

Figure 4:
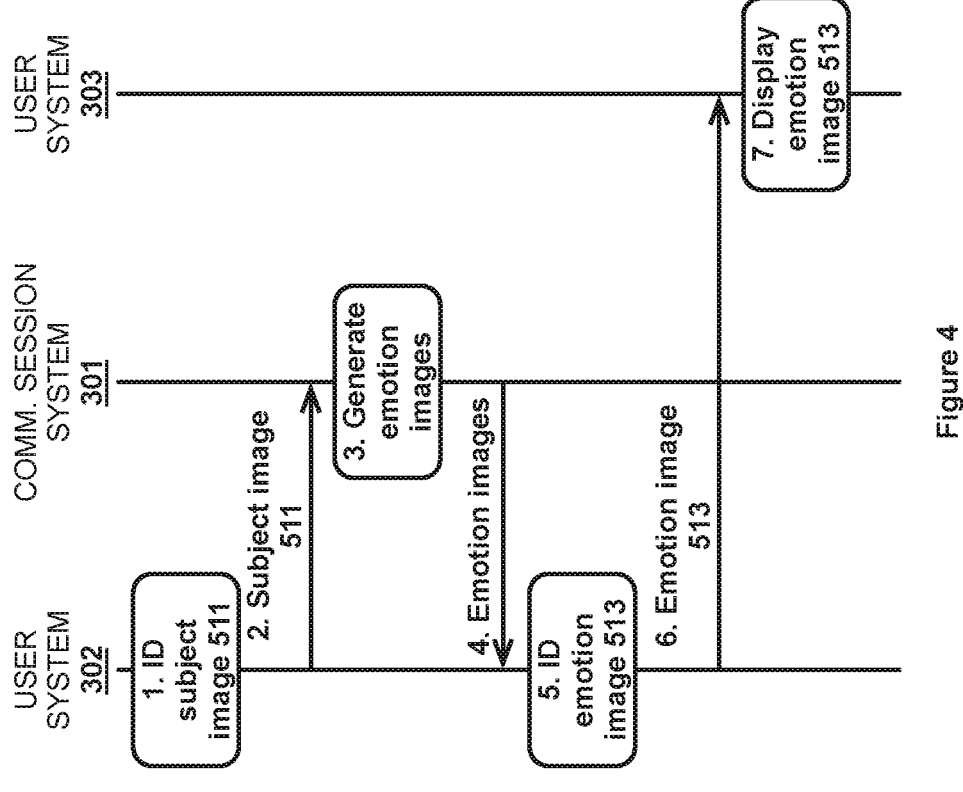
FIG. 4 illustrates an operational scenario for automatically generating an image, having an attribute, from a subject image.

FIG. 4 illustrates operational scenario 400 for automatically generating an image, having an attribute, from a subject image. In operational scenario 400, user system 302 identifies subject image 511 at step 1 for transmission to communication session system 301. Subject image 511 is a photo of user 342 in this example. User system 302 may identify subject image 511 when user 342 directs user system 302 to capture an image of user 342 using a camera of user system 302. For example, communication session system 301 may request subject image 511 from user 342 via user system 302 and, in response to that request, user 342 may direct user system 302 to capture subject image 511. In another example, user system 302 may identify subject image 511 when user 342 selects subject image 511 from among a library of images stored locally on user system 302 or in a remote system (e.g., an electronic photo album/camera roll or a social media album). Other manners of obtaining an image of user 342 may also be used. In some examples, subject image 511 may be identified specifically for communication session system 301 to generate images therefrom, as detailed below. In other examples, subject image 511 may be identified for some other predominant reason. For instance, communication session system 301 may maintain photos of users to use as profile pictures. A profile picture may be displayed by user systems to represent other users that can be contacted via communication session system 301 (e.g., displayed in a buddy list) and/or to identify a messaging conversation thread. Similarly, a profile picture may be used in a communication session to visually identify a user in situations where live images of the user are not present (e.g., when the user has their video turned off during a video session).

Regardless of how subject image 511 is identified, user system 302 transmits subject image 511 at step 2 to communication session system 301. Subject image 511 may be transmitted using any transmission protocol and in any image format supported by communication session system 301. Upon receiving subject image 511 communication session system 301 generates emotion images at step 3 using the process described in operational scenario 500 below. Although, other manners of generating the emotion images may be used in other examples. Each emotion image is a version of subject image 511 that has been modified to appear as though user 342 in subject image 511 is expressing a particular emotion (i.e., attribute), such as happiness, sadness, anger, indifference, etc. The emotion images are transmitted to user system 302 at step 4. Communication session system 301 may send full quality versions of the emotion images or lower quality versions (e.g., thumbnails) with a full quality version of an image being transmitted upon selection thereof at user system 302. Even after transmitting the emotion images to user system 302, which are stored thereat, communication session system 301 may maintain its own copies of the emotion images. Should user 342 access communication session system 301 from a different user system, that user system would also have access to the emotion images.

After receiving the emotion images, user system 302 identifies emotion image 513 from the emotion images at step 5 for transmission to user system 303 over a communication session facilitated by communication session system 301. In some examples, user system 302 may receive a selection of emotion image 513 from user 342. For instance, user system 302 may present user 342 with an interface to view the emotion images and select emotion image 513 from within the interface. In other examples, user system 302 may automatically select emotion image 513 based on the context of the conversation between user 342 and user 343 over the communication session. For example, if user 342 says (e.g., speaks, types, etc.) that they are experiencing the emotion associated with emotion image 513, then user system 302 may automatically identify emotion image 513.

After identifying emotion image 513, emotion image 513 is transmitted at step 6 to user system 303. Emotion image 513 may be transmitted automatically or in response to user 342 directing user system 302 to transmit emotion image 513 (e.g., pressing a submit button). In some examples, the version of emotion image 513 that is received by user system 303 may originate from user system 302 or communication session system 301. For instance, user 342 may select a thumbnail of emotion image 513 and user system 302 may responsively direct communication session system 301 to send the full quality version of emotion image 513 to user system 303.

After receiving emotion image 513, user system 303 displays emotion image 513 at step 7 to user 343. Emotion image 513 may be displayed using any visual convention supported by user system 303. In examples where a messaging conversation thread is used, emotion image 513 may be displayed in sequence within that thread (i.e., after the most recently sent or received message). In other examples, emotion image 513 may be displayed as a popup or in its own window. In further examples, if subject image 511 is being displayed by user system 303 (e.g., to indicate that user 342 is a participant on the thread), then emotion image 513 may replace subject image 511 in that display.

Figure 5:
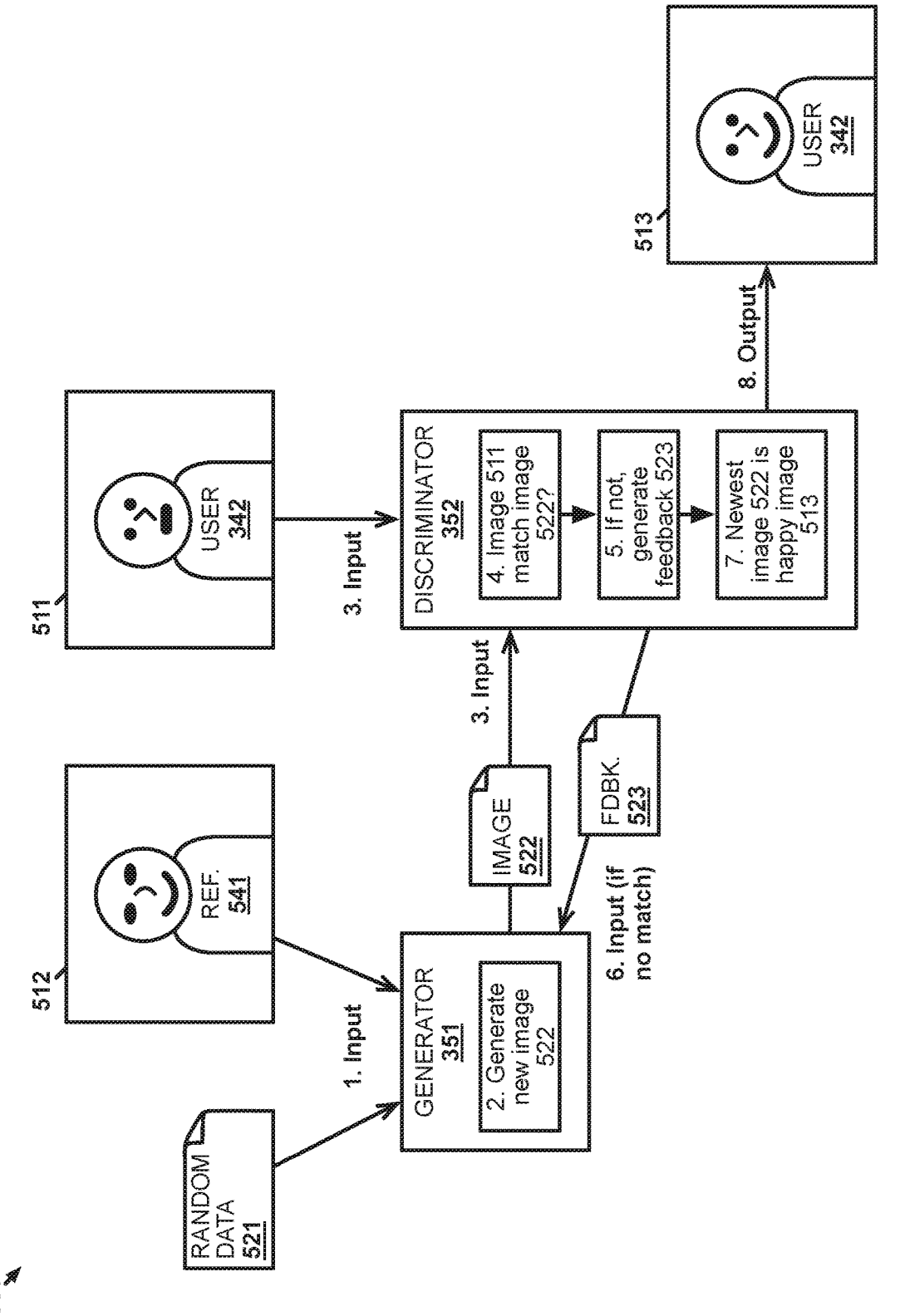
FIG. 5 illustrates an operational scenario for automatically generating an image, having an attribute, from a subject image.

FIG. 5 illustrates operational scenario 500 for automatically generating an image, having an attribute, from a subject image. Operational scenario 500 is performed by communication session system 301 in step 3 of operational scenario 400 to generate emotion image 513 for inclusion in the emotion images. In this example, emotion image 513 is an image of user 342 smiling to indicate that they are happy. The happiness attribute is indicated to generator 351, as described below, with reference image 512. Reference image 512 depicts a person, reference user 541, who is smiling to indicate that they are happy. Generator 351 uses reference image 512 to generate generated image 522. Generated image 522, likely after multiple iterations, will be an image that looks like subject image 511 but with user 342 smiling therein.

For a first iteration of steps in operational scenario 500, random data 521 and reference image 512 (i.e., the attribute) are input to generator 351 at step 1. Random data 521 is preferably in a same format as image predication 523 so that generator 351 does not need to be trained to handle a different format. Generator 351 generates generated image 522 at step 2 based on random data 521 and reference image 512 in accordance with a machine learning model generated from training generator 351. Since random data 521 has no relationship with subject image 511, generated image 522 in this first iteration likely looks nothing like subject image 511 if it were to be displayed.

Generated image 522 is then fed as input into discriminator 352 at step 3 along with subject image 511. As shown in subject image 511, user 342 has a neutral expression on their face (i.e., not actively expressing much, if any, emotion), although a neutral expression is not necessary for operational scenario 500. Discriminator 352 generates feedback 523 at step 4 based on generated image 522 and subject image 511 in accordance with a machine learning model generated from training discriminator 352. Feedback 523 defines differences between subject image 511 and generated image 522. Discriminator 352 further determines at step 5 whether the differences indicate generated image 522 is a sufficient match to subject image 511. As noted above, since generated image 522 in this iteration is based on random data 521, it is very unlikely that discriminator 352 will determine a sufficient match is present on this first iteration. The one or more criterion used by discriminator 352 to determine whether the differences indicate a sufficient match may be explicitly defined to discriminator 352 (e.g., programmed into discriminator 352 by a user) or discriminator 352 may be trained identify when a sufficient match exists (the exact one or more criterion may, therefore, not be known outside of the machine learning model of discriminator 352).

When the differences do not indicate a sufficient match, then feedback 523 is fed as input into generator 351 along with reference image 512 to begin another iteration of steps 2-5. Generator 351 generates a new generated image 522 at step 2 based on feedback 523 (in place of random data 521 from the first iteration) and reference image 512. The new generated image 522 is fed as input into discriminator 352 at step 3 along with subject image 511. Discriminator 352 generates a new feedback 523 at step 4 and determines whether differences indicated in that new feedback 523 indicates the new generated image 522 sufficiently matches subject image 511.

Should discriminator 352 again determine that generated image 522 does not sufficiently match subject image 511, the new feedback 523 is fed back into generator 351 with reference image 512 at step 6. Steps 2-6 then iteratively repeat with the newest version of feedback 523 being fed into generator 351 each time discriminator 352 determines that generated image 522 does not sufficiently match subject image 511.

When reaching an iteration where discriminator 352 does determine at step 5 that differences defined in feedback 523 indicate that generated image 522 from the iteration sufficiently matches subject image 511, generated image 522 from the present iteration is stored as emotion image 513 in the emotion images. In this case, emotion image 513 is associated with happiness, as was indicated by reference image 512. User 342 in step 5 of operational scenario 400 may, therefore, have wanted to show that they are happy and selected emotion image 513 from the other emotion images to express their happiness to user 343. As shown in operational scenario 500, emotion image 513 is a near identical copy of subject image 511 except for the face that user 342 is smiling. Even though the smile is different than what is shown in subject image 511, the rest of emotion image 513 matched subject image 511 sufficiently enough that the corresponding image predication 523 indicated that a sufficient match existed.

Communication session system 301 may repeat operational scenario 500 for each emotion attribute that is desired. There may be a default list of emotions for which communication session system 301 is configured to generate images or user 342 may indicate which emotions they want included in the generated images. For each emotion, a different corresponding reference image is fed into generator 351 in place of reference image 512. For example, an image of reference user 541 (or some other reference user) making a sad facial expression may be used generate an emotion image of user 342 expressing sadness.

Figure 6:
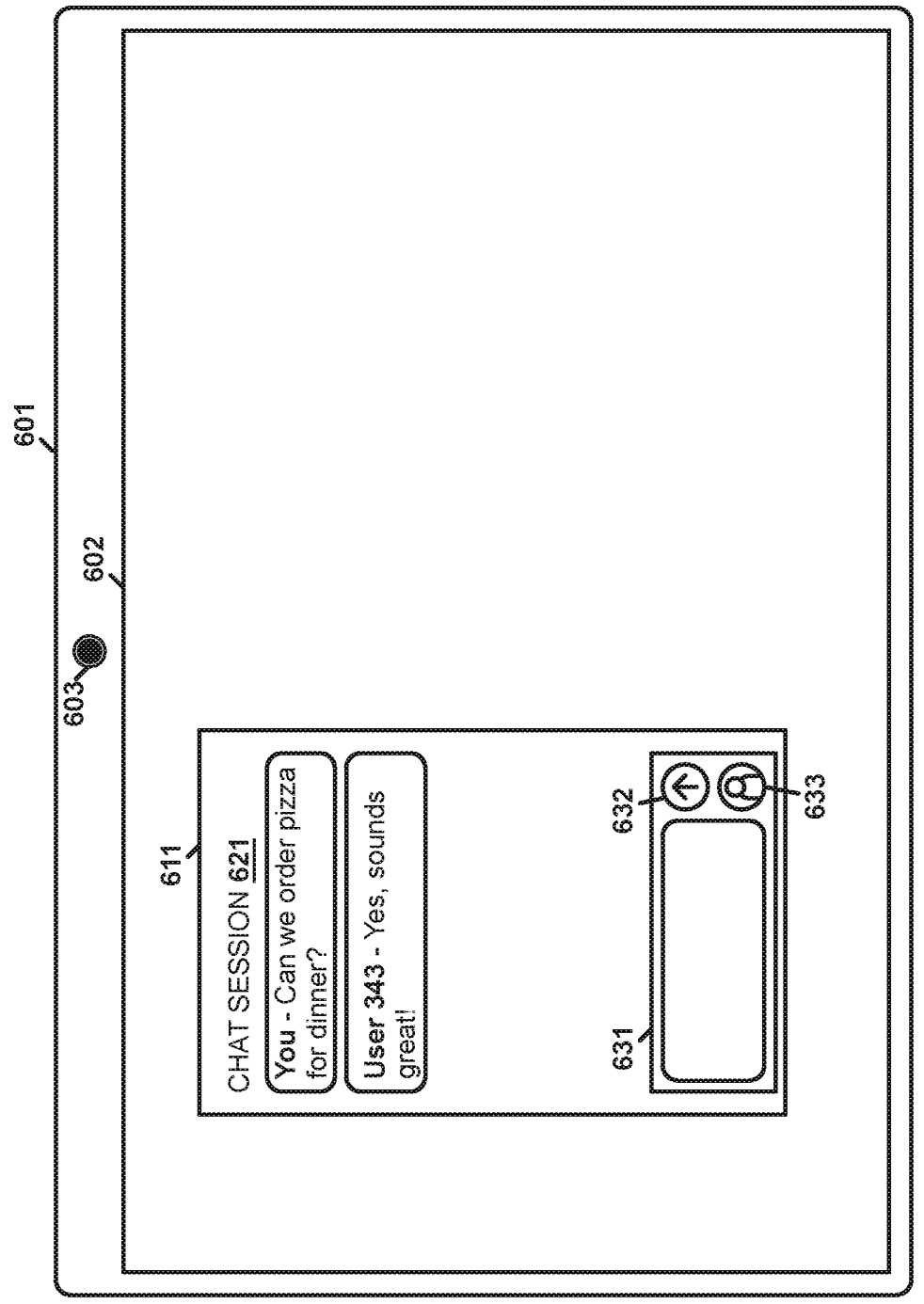
FIG. 6 illustrates a display system for automatically generating an image, having an attribute, from a subject image.

FIG. 6 illustrates display system 600 for automatically generating an image, having an attribute, from a subject image. Display system 600 is an example display system for user system 302. Display system 600 includes display housing 601, display 602, and camera 603. Display 602 may be a cathode ray tube (CRT), Liquid Crystal Display (LCD), Light Emitting Diode display (LED), or some other type of display capable of presenting images described below. Camera 603 includes optics and an image sensor for capturing pictures and/or video. Camera 603 may be omitted in some examples. In some examples, display system 600 may further include a microphone and/or one or more speakers for user 342 to input and receive voice communications over communication sessions.

In this example, display 602 is displaying session window 611, which may be a window of a communication client 611 executing on user system 302 for communicating with communication session system 301. Session window 611 is showing a conversation thread for chat session 621, which is facilitated by communication session system 301. Media entry window 631 in session window 611 enables user 342 to enter user communications for transmission to user system 303 for presentation to user 343 thereat. The user communications may include text, photos, files, or some other type of supported media. Selection of send button 632 sends the user communications entered into media entry window 631. In this case, user 342 already typed and sent a message asking about ordering pizza for dinner and received a response from user 343. User system 303 may present a similar window to session window 611 so that user 343 can participate in chat session 621. Emotion image button 633, when selected by user 342, provides user 342 with an interface to select one of the emotion images generated in operational scenario 400.

Figure 7:
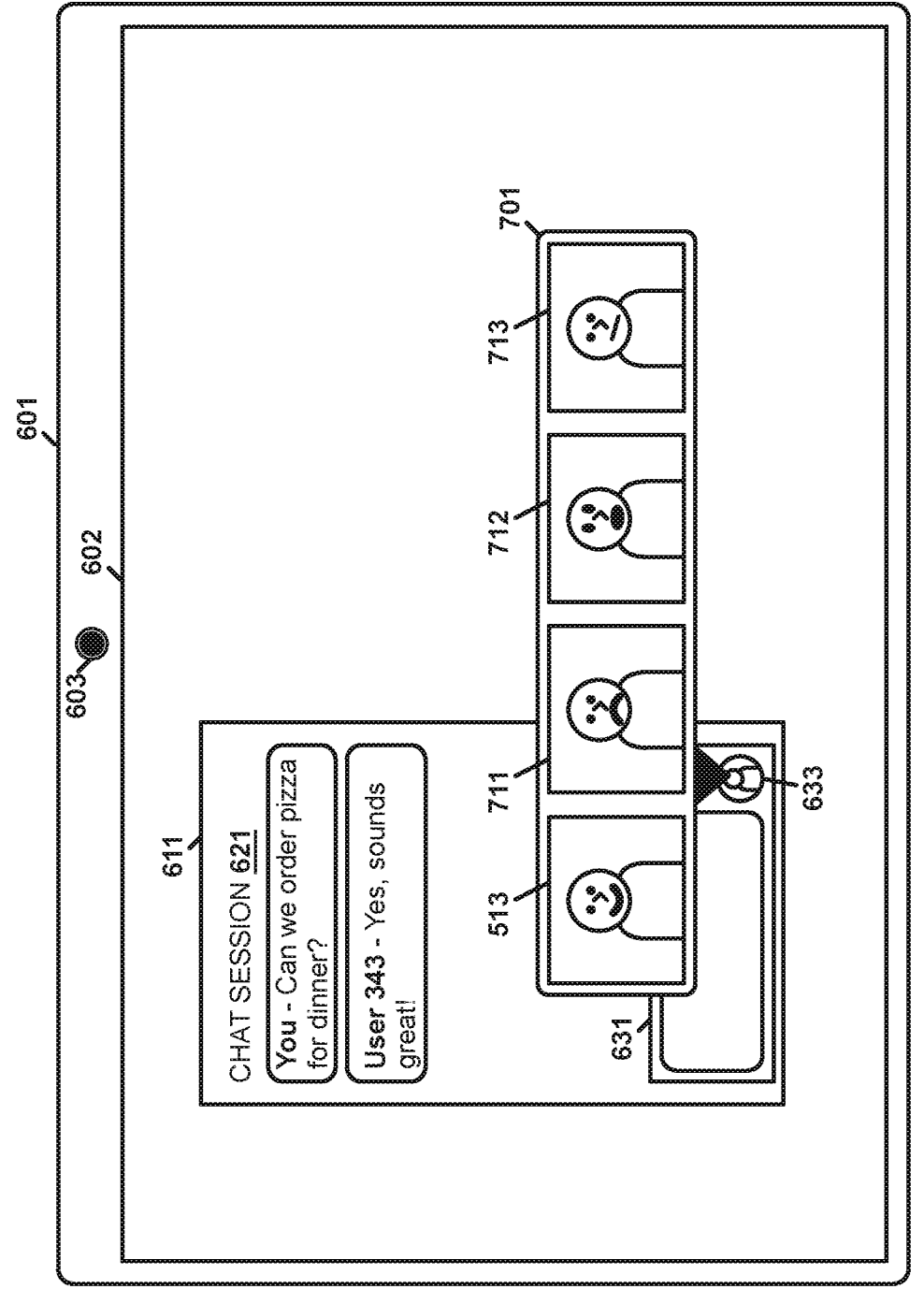
FIG. 7 illustrates a display system for automatically generating an image, having an attribute, from a subject image.

FIG. 7 illustrates display system 700 for automatically generating an image, having an attribute, from a subject image. Display system 700 is an example of display system 600 after user 342 has selected emotion image button 633. In response to user 342 selecting emotion image button 633, user system 302 directs display 602 to display image selection window 701, which displays emotion images available for selection. Within image selection window 701, emotion image 513 and emotion images 711-713 are presented to user 342. User 342 is able to select (e.g., click on, tap on, or otherwise indicate) one or more of the emotion images displayed in image selection window 701 for transmission to user 343 over chat session 621. In other examples, more emotion images may be available to user 342 and image selection window 701 may enable user 342 to scroll through those images if there are too many to display at once. Emotion image 513 shows user 342 as being happy, as described above in operational scenario 500. Emotion images 711-713 have also been generated using the process in operational scenario 500 with different reference images used as input to generator 351. Emotion image 711 shows user 342 sad, emotion image 712 shows user 342 surprised, and emotion image 713 shows user 342 unimpressed. While not displayed in this example, other examples may label each emotion image in image selection window 701 with the associated emotion (e.g., a "Happy" label may be displayed under emotion image 513). Likewise, as mentioned above, other examples may use methods other than that described in operational scenario 500 to generate the emotion images.

Figure 8:
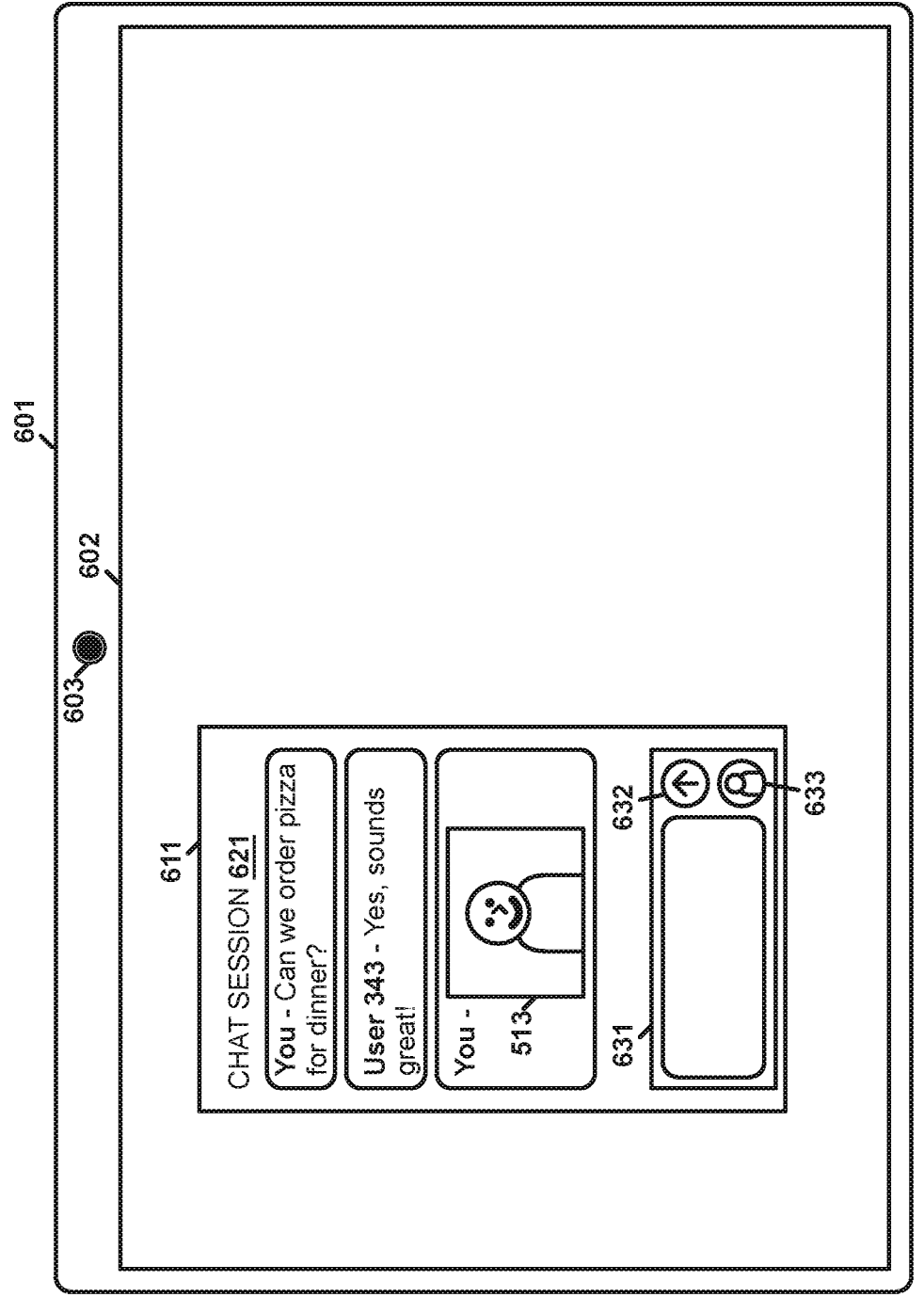
FIG. 8 illustrates a display system for automatically generating an image, having an attribute, from a subject image.

FIG. 8 illustrates display system 800 for automatically generating an image, having an attribute, from a subject image. Display system 800 is an example of display system 700 after user 342 selects emotion image 513 from image selection window 701. In particular, after selecting emotion image 513, emotion image 513 is transmitted over chat session 621 and is shown in the conversation thread of chat session 621 in session window 611. Upon receipt of emotion image 513 over chat session 621, user system 303 may similarly display emotion image 513 in a session window thereat. Emotion image 513 may be transmitted immediately upon select from image selection window 701 or a confirmation from user 342 may be requested after selection and before sending. For example, emotion image 513 may first populate in media entry window 631 and then only be sent over chat session 621 when send button 632 is selected by user 342. By sending emotion image 513, user 342 is able to express happiness to user 343 over user 343's agreement with ordering pizza. Since emotion image 513 is based on subject image 511 of user 342, sending emotion image 513 is a more personal expression than alternative mechanisms (e.g., emojis).

While the example above receives a user selection of emotion image 513, user system 302 may automatically select emotion image 513 for transmission in other examples. For example, user 342 may type words into media entry window 631 that indicate user 342 is happy. User system 302 may process those words to determine that user 342 may want to send a picture of user 342 looking happy. Emotion image 513 would then be selected as being the one of the emotion images that is associated with the happiness attribute.

Figure 9:
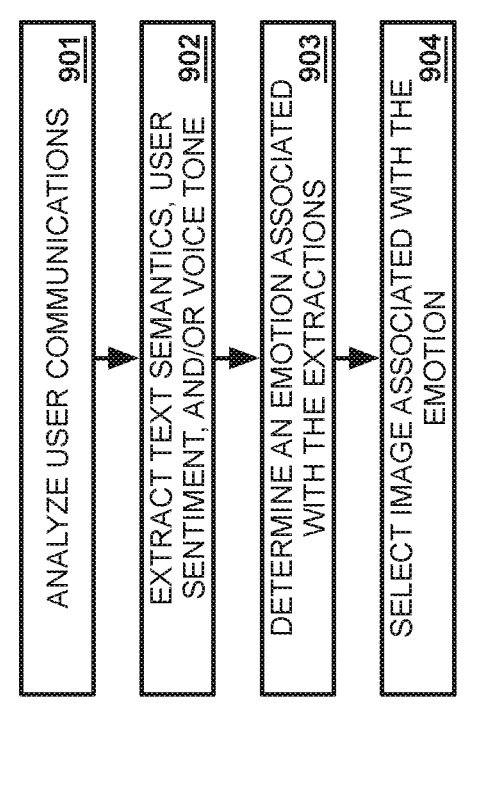
FIG. 9 illustrates an operation to automatically generate an image, having an attribute, from a subject image.

FIG. 9 illustrates operation 900 to automatically generate an image, having an attribute, from a subject image. Operation 900 is an example operation that may be performed by user system 302, communication session system 301, or some other system having access to emotion images generated from subject image 511. In operation 900, user communications exchanged between user 342 and user 343 over a communication session facilitated by communication session system 301. The user communications may include text, audio (e.g., voice), video, or other type of media captured from user 342 and/or user 343. The user communications are analyzed to determine an appropriate one of the emotion images corresponding to user 342's current state (e.g., state of emotion, physical expression, etc.) (901). In particular, one or more characteristics may be extracted from the user communications as indications of the user's current state (902). The characteristics may include text semantics (e.g., from text communications or from speech converted to text), user sentiment, and voice tone (i.e., for sessions that include a voice component)—including combinations thereof. The text semantics may be determined from text currently being typed by user 342 and/or from previously transmitted text (e.g., a most recent number of messages). Keywords/phrases may be identified in the text as being associated with a current state of user 342. User sentiment may be determined in part from the extracted text semantics (e.g., user 342 may express their sentiment explicitly in the text) or based on other factors surrounding the conversation occurring over the user communication (e.g., previous statements made by user 342, emojis/graphics used by user 342, etc.). Voice tone can also be analyzed to determine user 342's current emotional state. A voice tone model may be trained on various voice samples to identify when a user is experiencing a particular emotion (e.g., using an angry tone, excited tone, serious tone, etc.). While not used in this example, video captured of user 342 may be analyzed in other examples even though the video may not be transmitted over a communication session. For example, if user 342 is making an angry face in captured video, user 342 may be determined to be angry.

An emotion is determined based on the characteristics extracted (903). The emotion may be determined based on a single characteristic or some combination of characteristics. In some cases, different characteristics may conflict, and one characteristic may control. For example, user 342 may say "I am so happy about that". While the semantics of the sentence by itself indicate that user 342's emotional state is happy, the voice tone may indicate otherwise (e.g., that user 342 was making the statement sarcastically). As such, user 342's emotion may be angry or frustrated based on the voice tone used to say the above sentence. In some cases, an artificial intelligence model may be trained to best identify an emotion of user 342 from the various extracted characteristics. Regardless of how the emotion is determined, a one of the emotion images associated with emotion is selected for use (904). In the examples above, generated image 513 is selected when user 342 is determined to be happy.

In some examples, the selected image may be suggested to user 342 and require user 342's consent before being used. For instance, in the text chat example of FIGS. 6-8 user system 302 may perform operation 200 and suggest generated image 513 for transmission over chat session 621. User 342 can then decide to transmit generated image 513, select a different emotion image, or not transmit an image at all. In some examples, the selected image may be auto-populated into a particular function. For instance, the image may be auto-populated into chat session 621 above. In another example, user 342 may configure user system 302 to automatically change their profile picture during a communication session, such as chat session 621, depending on their current determined emotion. User system 302 may then perform operation 200 repeatedly (e.g., continually or periodically) to select a new one of the emotion images depending on user 342's current emotional state and auto-populate the selected image into user 342's profile picture for the communication session. In other examples, communication session system 301 may perform operation 200 on user communications passing through and select images on behalf of user 342 rather than operation 200 being performed local on user system 302. The system performing operation 200 is not necessarily the system that generated the emotion images. Regardless of how the selected emotion image ends up being used, operation 200 enables a system, such as user system 302 or communication session system 301, to automatically select an emotion image without explicit selection input from user 342.

Figure 10:
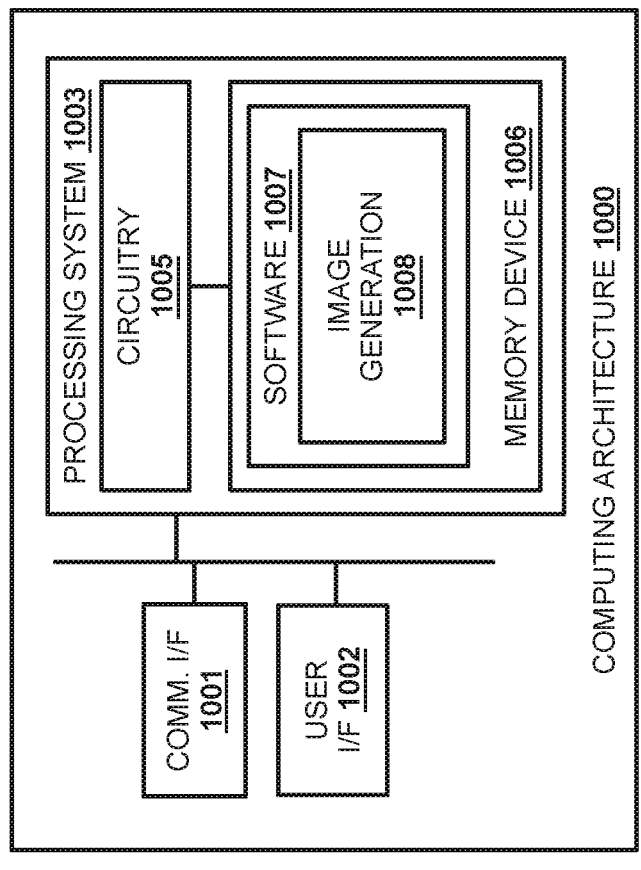
FIG. 10 illustrates a computing architecture for automatically generating an image, having an attribute, from a subject image.

FIG. 10 illustrates computing architecture 1000 for automatically generating an image, having an attribute, from a subject image. Computing architecture 1000 is an example computing architecture for image generation system 101 and communication session system 301, although systems 101 and 301 may use alternative configurations. Other systems described above, such as the endpoints, may also use computing architecture 1000. Computing architecture 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a computer readable storage medium, such as a disk drive, flash drive, data storage circuitry, or some other memory apparatus. In no examples would a computer readable storage medium of memory device 1006, or any other computer readable storage medium herein, be considered a transitory form of signal transmission (often referred to as "signals per se"), such as a propagating electrical or electromagnetic signal or carrier wave. Operating software 1007 comprises computer programs, firmware, or some other form of machine-readable processing instructions. Operating software 1007 includes image generation module 1008. Operating software 1007 may further include an operating system, utilities, drivers, network interfaces, applications, or some other type of software. When executed by processing circuitry 1005, operating software 1007 directs processing system 1003 to operate computing architecture 1000 as described herein.

In particular, image generation module 1008 directs processing system 1003 to execute a generator and a discriminator. Until an image predication satisfies a criterion, image generation module 1008 directs processing system 1003 to iteratively perform steps a-c. In step a, processing system 1003 provides an input vector and an attribute to the generator, wherein the generator outputs a generated image. In step b, processing system 1003 provides the generated image to the discriminator, wherein the discriminator outputs the image predication that defines the difference between the generated image and a subject image. In step c, processing system 1003 determines whether the image predication satisfies the criterion, wherein, when the image predication does not satisfy the criterion, the input vector comprises the image predication in the next iteration of steps a-c. When the image predication satisfies the criterion, image generation module 1008 directs processing system 1003 to associate the generated image with the attribute.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
executing a generator and a discriminator;
until a criterion is satisfied, iteratively performing steps a-c:
   a. providing an input vector and an attribute to the generator, wherein the generator outputs a generated image;
   b. providing the generated image to the discriminator, wherein the discriminator outputs feedback that indicates differences between the generated image and a subject image;
   c. determining whether the differences satisfy the criterion, wherein, when the differences do not satisfy the criterion, the input vector comprises the feedback in the next iteration of steps a-c; and
when the differences satisfy the criterion, associating the generated image with the attribute.

2. The method of claim 1, wherein in a first iteration of steps a-c, the input vector comprises a random input vector.

3. The method of claim 1, wherein the subject image comprises an image of a user and the attribute comprises an indicator of an emotion.

4. The method of claim 3, wherein, when the difference satisfies the criterion, the generated image comprises an image of the user expressing the emotion.

5. The method of claim 1, comprising:
until the criterion is satisfied, iteratively performing steps d-f:
   d. providing a second input vector and a second attribute to the generator, wherein the generator outputs a second generated image;
   e. providing the second generated image to the discriminator, wherein the discriminator outputs second feedback that defines second differences between the second generated image and the subject image;
   f. determining whether the second differences satisfy the criterion, wherein, when the second differences do not satisfy the criterion, the second input vector comprises the second feedback in the next iteration of steps a-c; and
when the second differences satisfy the criterion, associating the second generated image with the second attribute.

6. The method of claim 1, comprising:
transmitting the generated image over a communication session established between a first endpoint and a second endpoint.

7. The method of claim 6, wherein the subject image comprises an image of a user operating the first endpoint.

8. The method of claim 7, comprising:
before transmitting the generated image, receiving, from the user, a selection of the generated image from a plurality of generated images that are each associated with respective ones of a plurality of attributes.

9. The method of claim 8, comprising:
before receiving the selection, presenting the plurality of generated images to the user.

10. The method of claim 7, comprising:
before transmitting the generated image, identifying a context of user communications received from the user;
determining that the context corresponds to the attribute; and
selecting the generated image from a plurality of generated images based on the attribute.

11. An apparatus for a contact center system, the apparatus comprising:
one or more computer readable storage media;
a processing system, including processing circuitry, operatively coupled with the one or more computer readable storage media; and
program instructions stored on the one or more computer readable storage media that, when read and executed by the processing system, direct the processing system to:
   execute a generator and a discriminator;
   until a criterion is satisfied, iteratively perform steps a-c:
      a. provide an input vector and an attribute to the generator, wherein the generator outputs a generated image;
      b. provide the generated image to the discriminator, wherein the discriminator outputs feedback that indicates differences between the generated image and a subject image;
      c. determine whether the differences satisfy the criterion, wherein, when the differences do not satisfy the criterion, the input vector comprises the feedback in the next iteration of steps a-c; and
   when the differences satisfy the criterion, associate the generated image with the attribute.

12. The apparatus of claim 11, wherein in a first iteration of steps a-c, the input vector comprises a random input vector.

13. The apparatus of claim 11, wherein the subject image comprises an image of a user and the attribute comprises an indicator of an emotion.

14. The apparatus of claim 13, wherein, when the differences satisfy the criterion, the generated image comprises an image of the user expressing the emotion.

15. The apparatus of claim 11, wherein the program instructions direct the processing system to:

until the criterion is satisfied, iteratively perform steps d-f:

d. provide a second input vector and a second attribute to the generator, wherein the generator outputs a second generated image;

e. provide the second generated image to the discriminator, wherein the discriminator outputs second feedback that defines second differences between the second generated image and the subject image;

f. determine whether the second differences satisfy the criterion, wherein, when the second differences do not satisfy the criterion, the second input vector comprises the second feedback in the next iteration of steps a-c; and when the second differences satisfy the criterion, associate the second generated image with the second attribute.

16. The apparatus of claim 11, wherein the program instructions direct the processing system to:

transmit the generated image over a communication session established between a first endpoint and a second endpoint.

17. The apparatus of claim 16, wherein the subject image comprises an image of a user operating the first endpoint.

18. The apparatus of claim 17, wherein the program instructions direct the processing system to:

before the generated image is transmitted, receive, from the user, a selection of the generated image from a plurality of generated images that are each associated with respective ones of a plurality of attributes.

19. The apparatus of claim 17, wherein the program instructions direct the processing system to:

before the generated image is transmitted, identify a context of user communications received from the user;

determine that the context corresponds to the attribute; and select the generated image from a plurality of generated images based on the attribute.

20. One or more computer readable storage media having program instructions stored thereon that, when read and executed by a processing system of a contact center system, direct the contact center system to:

execute a generator and a discriminator;

for each of a plurality of attributes:

until a criterion is satisfied, iteratively perform steps a-c:

a. provide an input vector and an attribute of the plurality of attributes to the generator, wherein the generator outputs a generated image;

b. provide the generated image to the discriminator, wherein the discriminator outputs feedback that indicates differences between the generated image and a subject image;

c. determine whether the differences satisfy the criterion, wherein, when the differences do not satisfy the criterion, the input vector comprises the feedback in the next iteration of steps a-c; and when the differences satisfy the criterion, associate the generated image with the attribute.

* * * * *